United States Patent [19]
Na et al.

[11] Patent Number: 5,729,309
[45] Date of Patent: Mar. 17, 1998

[54] LIQUID CRYSTAL DISPLAY SUBSTRATE HAVING REPAIR LINES

[75] Inventors: Byoung-Sun Na; Dong-Kyu Kim, both of Kyungki-do, Rep. of Korea

[73] Assignee: Samsung Electronics Co., Ltd., Suwon, Rep. of Korea

[21] Appl. No.: 760,253

[22] Filed: Dec. 5, 1996

[30] Foreign Application Priority Data

Dec. 5, 1995 [KR] Rep. of Korea ............ 95-46791

[51] Int. Cl.⁶ ............... G02F 1/1343; G02F 1/13
[52] U.S. Cl. ............... 349/54; 349/55; 349/192
[58] Field of Search ............ 349/54, 55, 192, 349/40

[56] References Cited

U.S. PATENT DOCUMENTS

| 4,807,973 | 2/1989 | Kawasaki | 349/139 |
| 5,202,778 | 4/1993 | Niki | 349/54 |

FOREIGN PATENT DOCUMENTS

| 62-147432 | 7/1987 | Japan | 349/54 |
| 5-341312 | 12/1993 | Japan | 349/54 |

*Primary Examiner*—Anita Pellman Gross
*Attorney, Agent, or Firm*—Myers Bigel Sibley & Sajovec

[57] ABSTRACT

A liquid crystal display according to this invention has at least two repair lines. A first repair line crosses twice the data lines lying on the center portion of the substrate and once the some data lines which a second repair line crosses twice among the remainings. The data lines not lying on the center portion is shorter than the remaining data lines so that they do not cross the first repair line.

13 Claims, 3 Drawing Sheets

LIQUID CRYSTAL DISPLAY SUBSTRATE HAVING REPAIR LINES

BACKGROUND OF THE INVENTION

A. Field of the Invention

The present invention relates to a liquid crystal display substrate having repair lines.

B. Description of the Related Art

There are many flat panel displays, such as liquid crystal displays, plasma display panels (PDPs), electroluminescences (ELs) and field emission displays (FEDs). These flat panel displays have wiring structures in matrix type.

LCDs are typical displays representing the flat panel displays, and active matrix type LCDs using thin film transistors (hereinafter referred to as TFTs) as switching elements are commonly used.

A liquid crystal display generally includes two substrates and a liquid crystal material therebetween. The liquid crystal display substrates have a plurality of pixels and signal lines such as gate lines and data lines supplying signals to the pixels via TFTs. In addition, in order to repair the open of the signal lines, repair lines are often added to the substrate.

A conventional liquid crystal display substrate is described with reference to FIG. 1.

As shown in FIG. 1, a plurality of gate lines 12 are arranged in a transverse direction and each gate line 12 has an input pad 10 through which a gate signal is applied to it. A plurality of data lines 22 are arranged in a longitudinal direction and cross the gate lines 12. Each data line 22 has an input pad 20 through which a data signal is applied to it. A gate line 12 and a data line 22 is connected to a pixel (not shown) which has a pixel electrode (not shown) and a switching element (not shown), the pixel is formed in the area defined by the gate lines 12 and the data lines 22. A first and a second repair lines 14 and 16 are formed around the display area comprised of a plurality of pixels. Since each repair line 14 or 16 is closed and encloses the display area, it cross the gate lines 12 and the data lines 22 twice. The first repair line 14 is enclosed by the second repair line 16.

When a data line D1 is opened at an open point OP1, the data line D1 and the first (or the second) repair line 14 are shorted at their two cross points SP1 and SP2. Then, the data signal may flow into the portion of the data line D1 below the open point OP1 along the path P1 and the path P2 in the repair line 14. However, since the path P2 is longer than the path P1, it should be blocked. Therefore, the repair line 14 is cut at the points CP1 and CP2 in the path P2 between the short points SP1 and SP2 and the cross points of the path P2 and the nearest data line D2.

Let us assume that two data lines D1 and D2 are opened at open points OP1 and OP2, respectively, and the data line D2 is closer to the middle portion of the display area than the data line D1. Then, the data line D1 and the first repair line 14 are shorted at their two cross points SP1 and SP2, and the data line D2 and the second repair line 16 are shorted at their two cross points SP3 and SP4. Thereafter, the repair lines 14 and 16 are cut at the points CP1, CP2, CP3 and CP4 between the short points SP1, SP2, SP3 and SP4 and the cross points of the longer paths P2 and P4 and the nearest data lines D2 and D3, respectively. Then, the data signals entered into the data lines D1 and D2 may reach at the portions of the data lines D1 and D2 below the open points OP1 and OP2 along the path P1 and the path P3 in the repair lines 14 and 16.

Compared with the path P1, the RC delay in the signal through the P3 is large since the path P3 is long and has more cross points with the data lines 22. This delay becomes larger as the number of the signal lines increases.

SUMMARY OF THE INVENTION

An object of the present invention is to reduce the RC delay when using a repair line.

The present invention has at least two repair lines. A first repair line crosses twice the data lines lying on the center portion of the substrate and once data lines which a second repair line crosses twice among the remainings.

It is preferable that the data lines lying on the center portion have longer length than the remaining data lines. All the data lines crossing the second repair line may be left or right to the data lines lying on the center portion.

BRIEF DESCRIPTION OF THE DRAWINGS

The present invention will become more fully understood from the detailed description given herein below and the accompanying drawings which are given by way of illustration only, and thus are not limitative of the present invention and wherein.

DETAILED DESCRIPTION OF THE PREFERRED EMBODIMENTS

Now, the first embodiment according to the present invention will be described.

Figure 2:
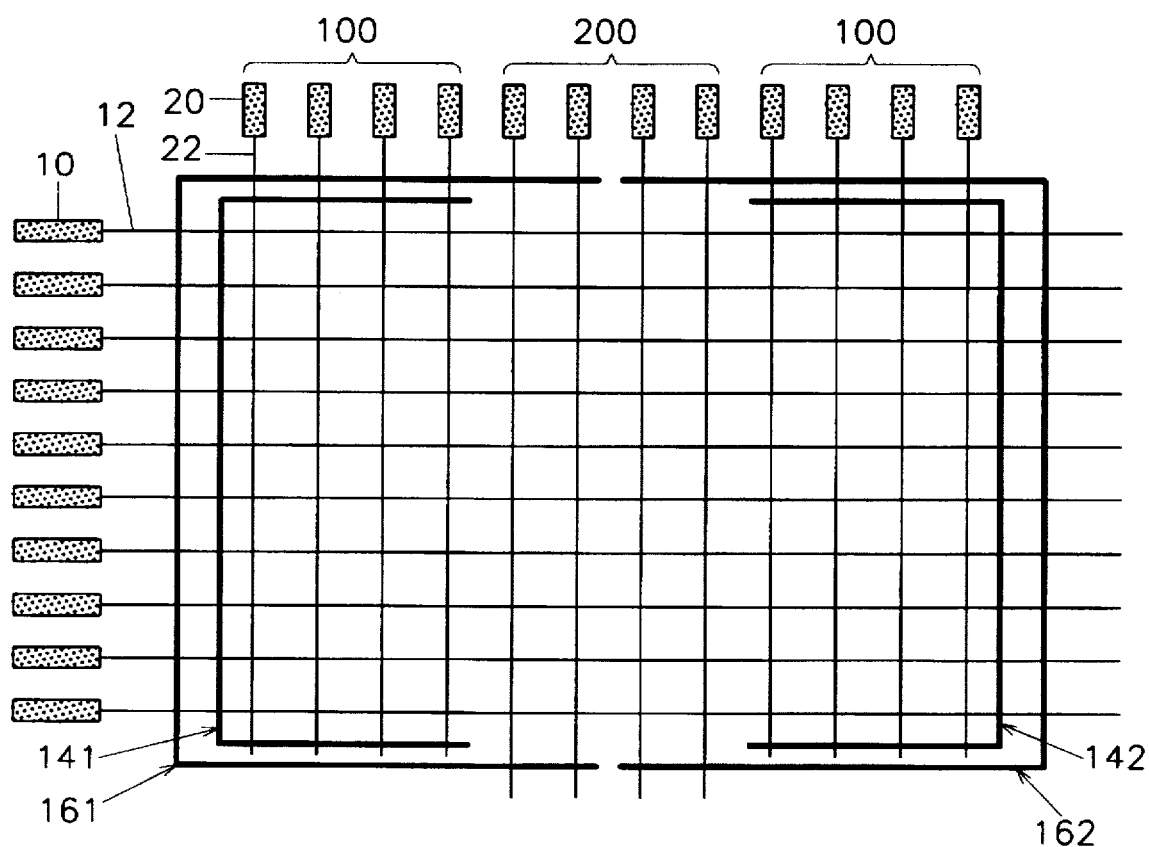
FIG. 2 shows a liquid crystal display substrate according to the embodiment of the present invention.

As shown in FIG. 2, a plurality of gate lines 12 are arranged in a transverse direction and each gate line has an input pad 10 through which a gate signal is applied to it. A plurality of data lines 22 are arranged in a longitudinal direction and cross the gate lines 12. Each data line has an input pad 20 through which a data signal is applied to it. A gate line 12 and a data line 22 are connected to a pixel (not shown) having a pixel electrode (not shown) and a switching element (not shown), and the pixels are formed in the area defined by the gate lines 12 and the data lines. The data lines 22 are grouped into a center block 200 and edge blocks 100. The data lines 22 of the center block 200 have longer lengths than the data lines 22 of the edge blocks 100. A pair of first repair lines 141 and 142 and a pair of second repair lines 161 and 162 are symmetrically arranged around the display area. The first repair lines 141 and 142 cross twice the data lines 22 in edge blocks 100 and cross once the gate lines 12. The second repair lines 141 and 142 cross once the data lines 22 in edge blocks 100 and the gate lines 12 and cross twice the data lines 22 in the center block 200. In FIG. 2, the number of the data lines 22 are twelve, four of them are in the center block 200 and eight of them are in the edge blocks 100. Each second repair line 161 or 162 cross once the two data lines in the center block 200.

A repair method in case that two data lines D1 and D2 are opened at open points OP1 and OP2, respectively, the data line D1 is in the edge block 100 and the data line D2 is in the center block 200. Then, the data line D1 and the first repair line 141 are shorted at their two cross points SP1 and SP2, and the data line D2 and the second repair line 161 are shorted at their two cross points SP3 and SP4. Thereafter, the repair line 161 is cut at the points CP3 and CP4 between the short points SP3 and SP4 and the cross points of the repair line 161 and the nearest data line D3 more closer to the middle portion of the substrate than the opened data line D2. Then, the data signals entered into the data lines D1 and D2 may reach at the portions of the data lines D1 and D2 below the open points OP1 and OP2 along the path P1 of the first repair line 141 and the path P3 of the second repair line 161, respectively.

Figure 1:
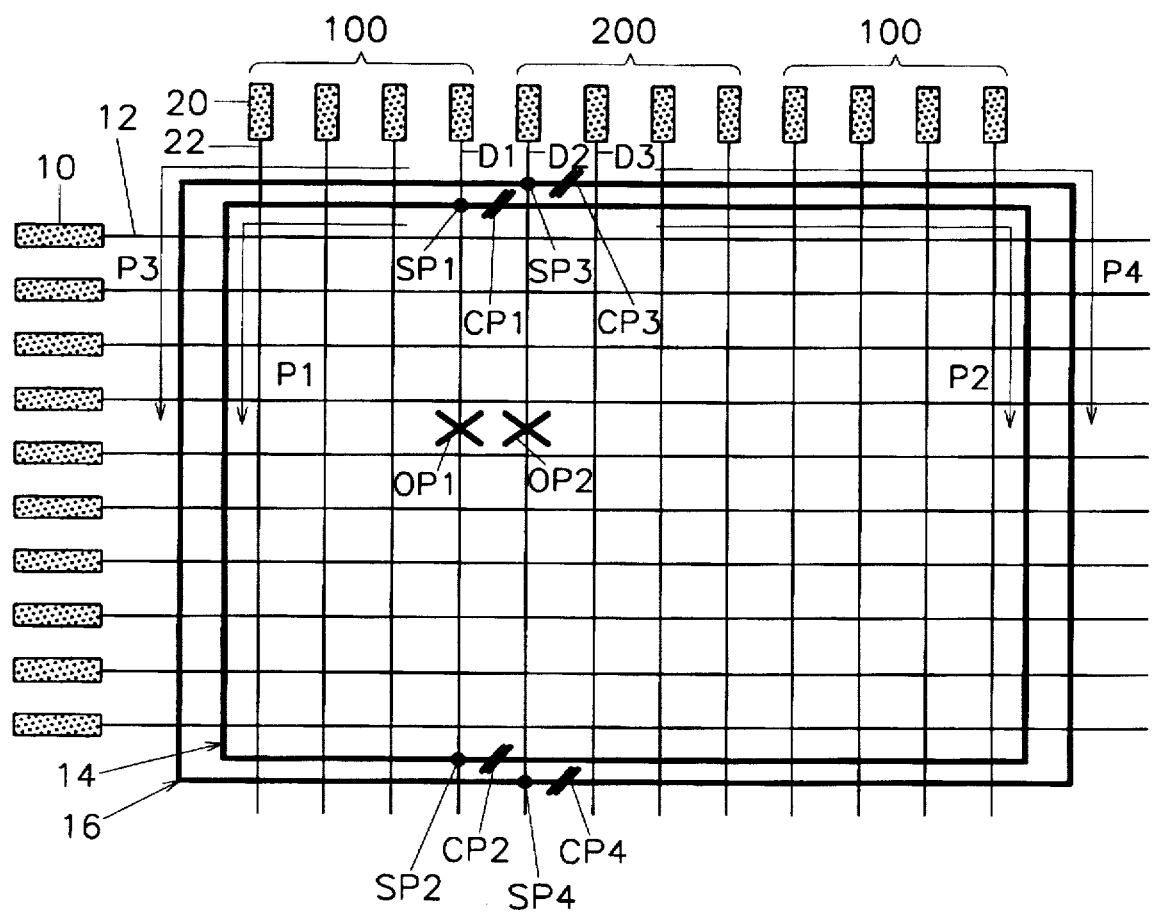
FIG. 1 shows a conventional liquid crystal display substrate having repair lines and its repair method.

The path P3 of this embodiment crosses six times the data lines 12, while the path P3 of the conventional method in FIG. 1 crossing ten times. Therefore, the RC delay in the data signal is reduced. In addition, since the path P1 of this embodiment crosses eight times the data lines 12, the RC delay in the signals flowing along the paths P1 and P2 are similar. Hence, the image quality increases.

What is claimed is:

1. A liquid crystal display panel, comprising:
   a substrate;
   a plurality of gate lines on said substrate;
   a plurality of data lines on said substrate extending transverse to said plurality of gate lines, said plurality of data lines including first and second groups of data lines;
   a first repair line on said substrate which crosses said first group of data lines on respective opposite first and second sides of said plurality of gate lines; and
   a second repair line on said substrate which crosses said first and second groups of data lines on said first side of said plurality of gate lines, which crosses said second group of data lines on said second side of said plurality of gate lines, and which avoids crossing said first group of data lines on said second side of said plurality of gate lines.

2. A panel according to claim 1, wherein said first group of data lines is disposed laterally adjacent said second group of data lines.

3. A panel according to claim 2, wherein each of said first and second repair lines extends across said plurality of gate lines on a side of said plurality of data lines.

4. A panel according to claim 3, wherein said second group of data lines extend past said first group of data lines on said second side of said plurality of gate lines.

5. A panel according to claim 2:
   wherein said first group of data lines is disposed on a first peripheral portion of said substrate;
   wherein said second group of data lines is disposed on a first medial portion of said substrate adjacent said first peripheral portion;
   wherein said plurality of data lines further comprises:
      a third group of data lines on a second medial portion of said substrate adjacent said first medial portion; and
      a fourth group of data lines on a second peripheral portion of said substrate laterally adjacent said second medial portion; and
   wherein the panel further comprises:
      a third repair line on said substrate which crosses said fourth group of data lines on said first and second sides of said plurality of gate lines; and
      a fourth repair line on said substrate which crosses third and fourth groups of data lines on said first side of said plurality of gate lines, which crosses said third group of data lines on said second side of said plurality of gate lines, and which avoids crossing said fourth group of data lines on said second side of said plurality of gate lines.

6. A panel according to claim 5 wherein said third and fourth repair lines each extend across said gate lines on a side of said plurality fourth group of data lines opposite said third group of data lines.

7. A panel according to claim 6, wherein said second and third groups of data lines extend past said first and fourth groups of data lines on said second side of said plurality of gate lines.

8. A liquid crystal display panel, comprising:
   a substrate;
   a plurality of gate lines on said substrate;
   a plurality of data lines on said substrate extending transverse to said plurality of gate lines;
   a plurality of repair lines on said substrate, a respective one of which crosses a selected group of said plurality of data lines on both of opposite first and second sides of said plurality of gate lines and which avoids crossing data lines other than said selected group of data lines on said second side of said plurality of gate lines.

9. A panel according to claim 8, wherein each of said plurality of repair lines extends across said plurality of gate lines on a side of said plurality of data lines.

10. A liquid crystal display panel, comprising:
    a substrate;
    a plurality of first lines on said substrate;
    a plurality of second lines on said substrate extending transverse to said plurality of first lines;
    a repair line on said substrate which crosses a selected group of said plurality of second lines on both of opposite first and second sides of said plurality of first lines and which avoids crossing second lines other than said selected group of second lines on said second side of said plurality of first lines.

11. A panel according to claim 10, wherein said repair line extends across said plurality of first lines on a side of said plurality of second lines.

12. A method of repairing an open data line of a liquid crystal display panel including a substrate, a plurality of gate lines on the substrate, and a plurality of data lines on the substrate, the plurality of data lines extending transverse to the plurality of gate lines, the method comprising the steps of:
    connecting separated portions of the open data line with a repair line which crosses a selected group of the data lines on respective opposite first and second sides of the plurality of gate lines and which avoids crossing data lines of the plurality of data lines other than the selected group of data lines on the second side of the plurality of gate lines.

13. A method according to claim 12, wherein said step of connecting comprises the steps of:
    connecting a first portion of the open data line and the repair line at a first point on the first side of the plurality of gate lines; and
    connecting a second portion of the open data line and the repair line at a second point on the second side of the plurality of gate lines.

* * * * *

UNITED STATES PATENT AND TRADEMARK OFFICE
CERTIFICATE OF CORRECTION

PATENT NO. : 5,729,309
DATED : Mar. 17, 1998
INVENTOR(S) : Na et al.

It is certified that error appears in the above-identified patent and that said Letters Patent is hereby corrected as shown below:

The title page should be deleted and substitute as per attached.

Drawing sheets 1-3 should be deleted and substituted with drawing sheets 1-3 as per attached.

Please delete columns 1-4 and substitute columns 1-6 as per attached.

Signed and Sealed this

Tenth Day of November 1998

*Attest:*

BRUCE LEHMAN

*Attesting Officer*   Commissioner of Patents and Trademarks

United States Patent
Na et al.

Patent Number: 5,729,309
Date of Patent: Mar. 17, 1998

[54] LIQUID CRYSTAL DISPLAY SUBSTRATE HAVING REPAIR LINES

[75] Inventors: Byoung-Sun Na; Dong-Kyu Kim, both of Kyungki-do, Rep. of Korea

[73] Assignee: Samsung Electronics Co., Ltd., Suwon, Rep. of Korea

[21] Appl. No.: 760,253

[22] Filed: Dec. 5, 1996

[30] Foreign Application Priority Data

Dec. 5, 1995 [KR] Rep. of Korea .................. 95-46791

[51] Int. Cl.$^6$ .................. G02F 1/1343; G02F 1/13
[52] U.S. Cl. .................. 349/54; 349/55; 349/192
[58] Field of Search .................. 349/54, 55, 192, 349/40

[56] References Cited

U.S. PATENT DOCUMENTS

| | | | |
|---|---|---|---|
| 4,807,973 | 2/1989 | Kawasaki | 349/139 |
| 5,202,778 | 4/1993 | Niki | 349/54 |

FOREIGN PATENT DOCUMENTS

| | | | |
|---|---|---|---|
| 62-147432 | 7/1987 | Japan | 349/54 |
| 5-341312 | 12/1993 | Japan | 349/54 |

*Primary Examiner*— Anita Pellman Gross
*Attorney, Agent, or Firm*— Myers Bigel Sibley & Sajovec

[57] ABSTRACT

A liquid crystal display (LCD) panel includes a substrate, a plurality of gate lines on the substrate, and a plurality of data lines on the substrate extending transverse to the plurality of gate lines, the plurality of data lines including first and second groups of data lines. A first repair line is formed on the substrate which crosses the first group of data lines on respective opposite first and second sides of the plurality of gate lines. A second repair line is formed on the substrate which crosses the first and second groups of data lines on the first side of the plurality of gate lines, which crosses the second group of data lines on the second side of the plurality of gate lines, and which avoids crossing the first group of data lines on the second side of the plurality of gate lines. The first group of data lines may be disposed laterally adjacent the second group of data lines, and each of the first and second repair lines may extend across the plurality of gate lines on a side of the plurality of data lines. The second group of data lines may extend past the first group of data lines on the second side of the plurality of gate lines.

13 Claims, 3 Drawing Sheets

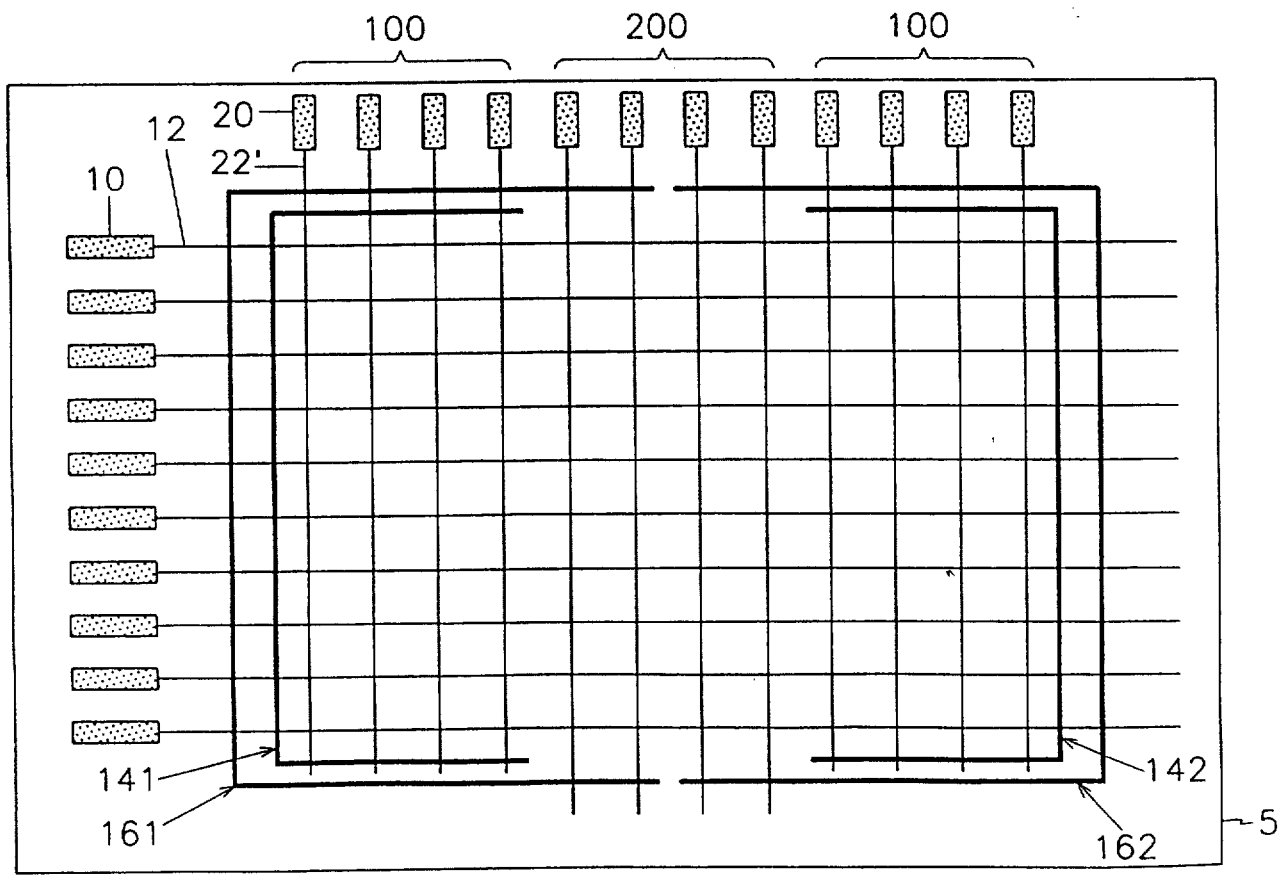

LIQUID CRYSTAL DISPLAY SUBSTRATE HAVING REPAIR LINES

FIELD OF THE INVENTION

The present invention relates to liquid crystal displays (LCDs), more particularly, to liquid crystal display panels and methods for repair thereof.

BACKGROUND OF THE INVENTION

There are many types of flat panel displays, such as liquid crystal displays, plasma display panels (PDPs), electroluminescent displays (ELDs) and field emission displays (FEDs). Many of these flat panel displays have matrix-type wiring structures. For example, an LCD typically includes two panels and a liquid crystal material contained therebetween. The liquid crystal display panels typically include a substrate having a plurality of pixels defined thereon and signal lines such as gate lines and data lines formed on the substrate for supplying signals to the pixels via thin-film transistors (TFTs). In order to repair open signal lines, repair lines may also be formed on the substrate.

As shown in FIG. 1, a plurality of gate lines 12 may be arranged in a transverse direction, with each gate line 12 having an input pad 10 to which a gate signal may be applied. A plurality of data lines 22 may be arranged in a longitudinal direction, crossing the gate lines 12. Each data line 22 may have an input pad 20 connected thereto to which a data signal may be applied. Each gate line 12 and each data line 22 typically are connected to a pixel (not shown) which has a pixel electrode (not shown) and a switching element (not shown), with the pixels occupying the areas defined by the gate lines 12 and the data lines 22. First and second repair lines 14 and 16 may be formed around the display area. Since each repair line 14, 16 typically encloses the display area, it crosses the gate lines 12 and the data lines 22 twice, with the first repair line 14 being enclosed by the second repair line 16.

To repair a data line D1 which is opened at an open point OP1, the data line D1 and the first repair line 14 or the second repair line 16 may be shorted at a cross point SP1, SP2, allowing a data signal to flow into the portion of the data line D1 below the open point OP1 along the path P1 and the path P2 in the repair line 14. However, because the path P2 is longer than the path P1, it typically is blocked by cutting the repair line 14 at cut points CP1, CP2 in the path P2 between the short points SP1 and SP2 and the cross points of the path P2 and the nearest data line D2. For example, the two data lines D1, D2 may be opened at first and second open points OP1, OP2, respectively. To repair the data lines D1, D2, the data line D1 and the first repair line 14 may be shorted at their two cross points SP1, SP2, the data line D2 and the second repair line 16 may be shorted at their two cross points SP3, SP4, and the repair lines 14, 16 may be cut at the points CP1, CP2, CP3, CP4 between the short points SP1, SP2, SP3, SP4 and the cross points of the longer paths P2 and P4 and the nearest data lines D2, D3, respectively. This allows data signals to reach portions of the data lines D1, D2 below the open points OP1, OP2 along the paths P1, P3 defined by the repair lines 14, 16.

Comparing the path P1 with the path P3, however, the RC delay in the signal through the P3 may be larger than the delay through the path P1 as the path P3 is long and crosses more of the data lines 22. This delay may become larger as the number of the signal lines increases.

SUMMARY OF THE INVENTION

In light of the foregoing, it is an object of the present invention to provide liquid crystal display panels and methods for repair thereof which provide improved RC characteristics over conventional repair techniques.

This and other objects, features and advantages are provided according to the present invention by liquid crystal display panels and methods of repair therefor in which an opened data line is repaired by connecting separated portions of the open data line with a repair line which is selectively routed to cross a selected group of the data lines on respective opposite first and second sides of the gate lines of the panel while avoiding crossing data lines of the plurality of data lines other than the selected group of data lines on the second side of the plurality of gate lines. Preferably, the plurality of repair lines includes a first repair line which crosses a first group of data lines on the first and second sides of the gate lines, and a second repair line which crosses a second group of data lines along with the first group of data lines on the first side of the plurality of gate lines, but which only crosses the second group of data lines on the second side of the gate lines. In this manner, the number of crossings of data lines by a repair line can be reduced, potentially reducing RC delay associated with using the repair line.

In particular, according to the present invention, a liquid crystal display (LCD) panel includes a substrate, a plurality of gate lines on the substrate, and a plurality of data lines extending transverse to the plurality of gate lines, the plurality of data lines including first and second groups of data lines. A first repair line is formed on the substrate which crosses the first group of data lines on respective opposite first and second sides of the plurality of gate lines. A second repair line is formed on the substrate which crosses the first and second groups of data lines on the first side of the plurality of gate lines, which crosses the second group of data lines on the second side of the plurality of gate lines, and which avoids crossing the first group of data lines on the second side of the plurality of gate lines. The first group of data lines may be disposed laterally adjacent the second group of data lines, and each of the first and second repair lines may extend across the plurality of gate lines on a side of the plurality of data lines. Preferably, the second group of data lines extends past the first group of data lines on the second side of the plurality of gate lines.

The first group of data lines may be disposed on a first peripheral portion of the substrate, while the second group of data lines may be disposed on a first medial portion of the substrate adjacent the first peripheral portion. The plurality of data lines may further include a third group of data lines on a second medial portion of the substrate adjacent the first medial portion and a fourth group of data lines on a second peripheral portion of the substrate laterally adjacent the second medial portion. A third repair line may be formed on the substrate which crosses the fourth group of data lines on the first and second sides of the plurality of gate lines. A fourth repair line may be formed on the substrate which crosses the third and fourth groups of data lines on the first side of the plurality of gate lines, which crosses the third group of data lines on the second side of the plurality of gate lines, and which avoids crossing the fourth group of data lines on the second side of the plurality of gate lines. The third and fourth repair lines may each extend across the gate lines on a side of the plurality fourth group of data lines opposite the third group of data lines. Preferably, the second and third groups of data lines extend past the first and fourth groups of data lines on the second side of the plurality of gate lines.

According to method aspects, an open data line of a liquid crystal display panel including a substrate, a plurality of gate lines on the substrate, and a plurality of data lines extending transverse to the plurality of gate lines, may be repaired by connecting separated portions of the open data line with a repair line which crosses a selected group of the data lines on respective opposite first and second sides of the plurality of gate lines and which avoids crossing data lines of the plurality of data lines other than the selected group of data lines on the second side of the plurality of gate lines. The open data line may be connected to the repair line by connecting a first portion of the open data line and the repair line at a first point on the first side of the plurality of gate lines, and connecting a second portion of the open data line and the repair line at a second point on the second side of the plurality of gate lines. A repair path with reduced RC delay may thereby be provided.

BRIEF DESCRIPTION OF THE DRAWINGS

Figure 3:
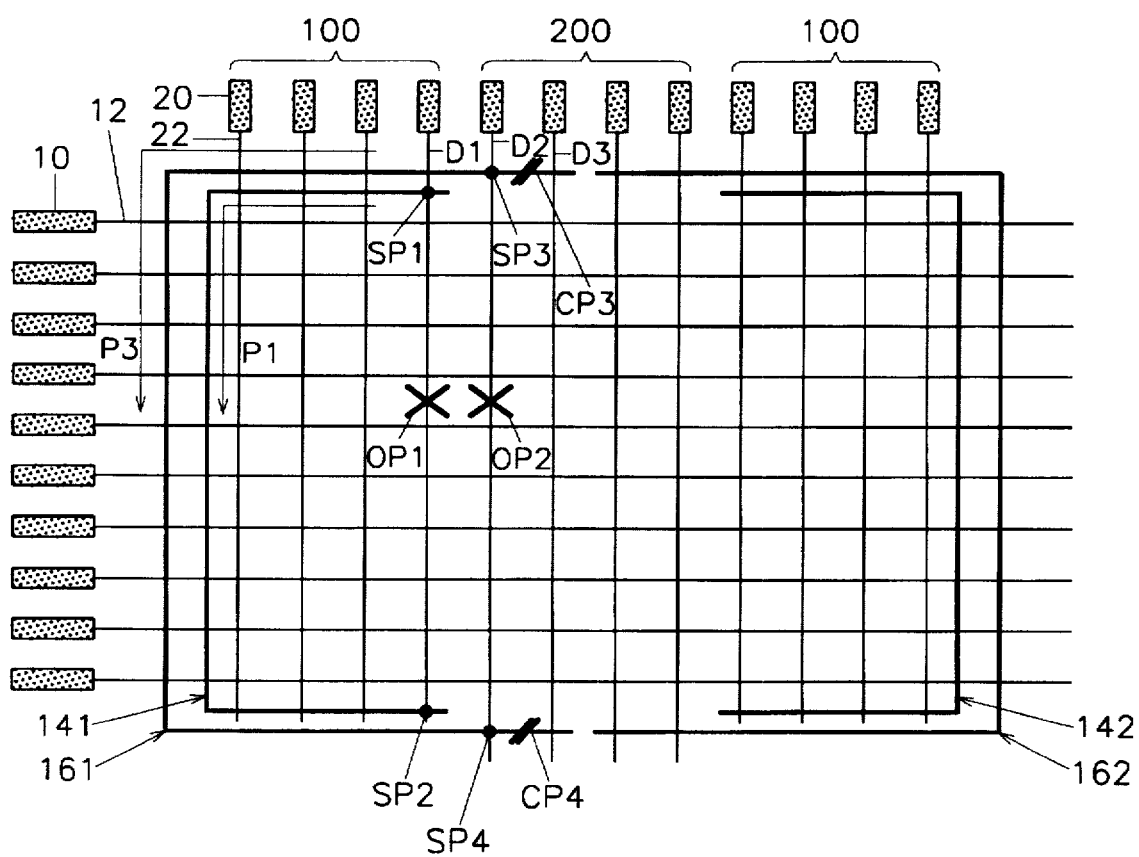
FIG. 3 shows a repair method of the liquid crystal display substrate shown in FIG. 2.
Figure 1:
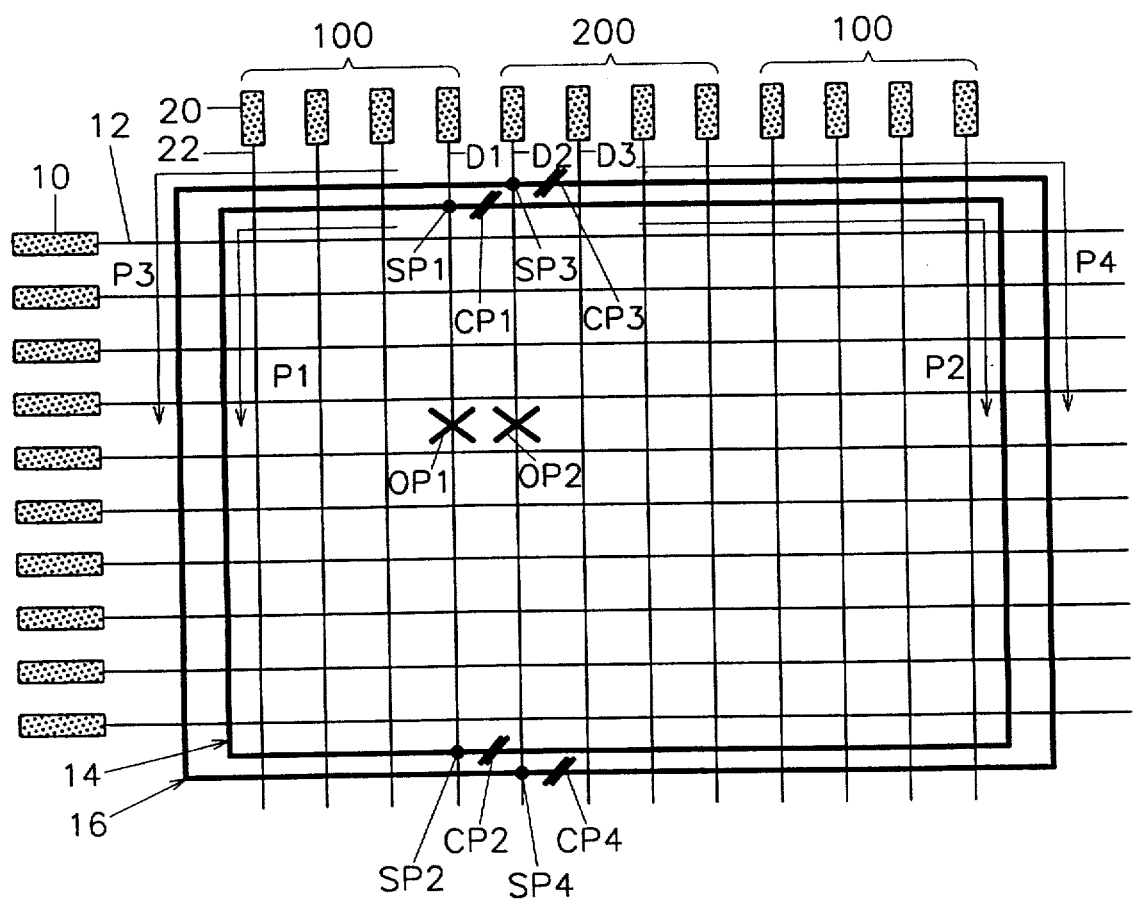
Figure 2:
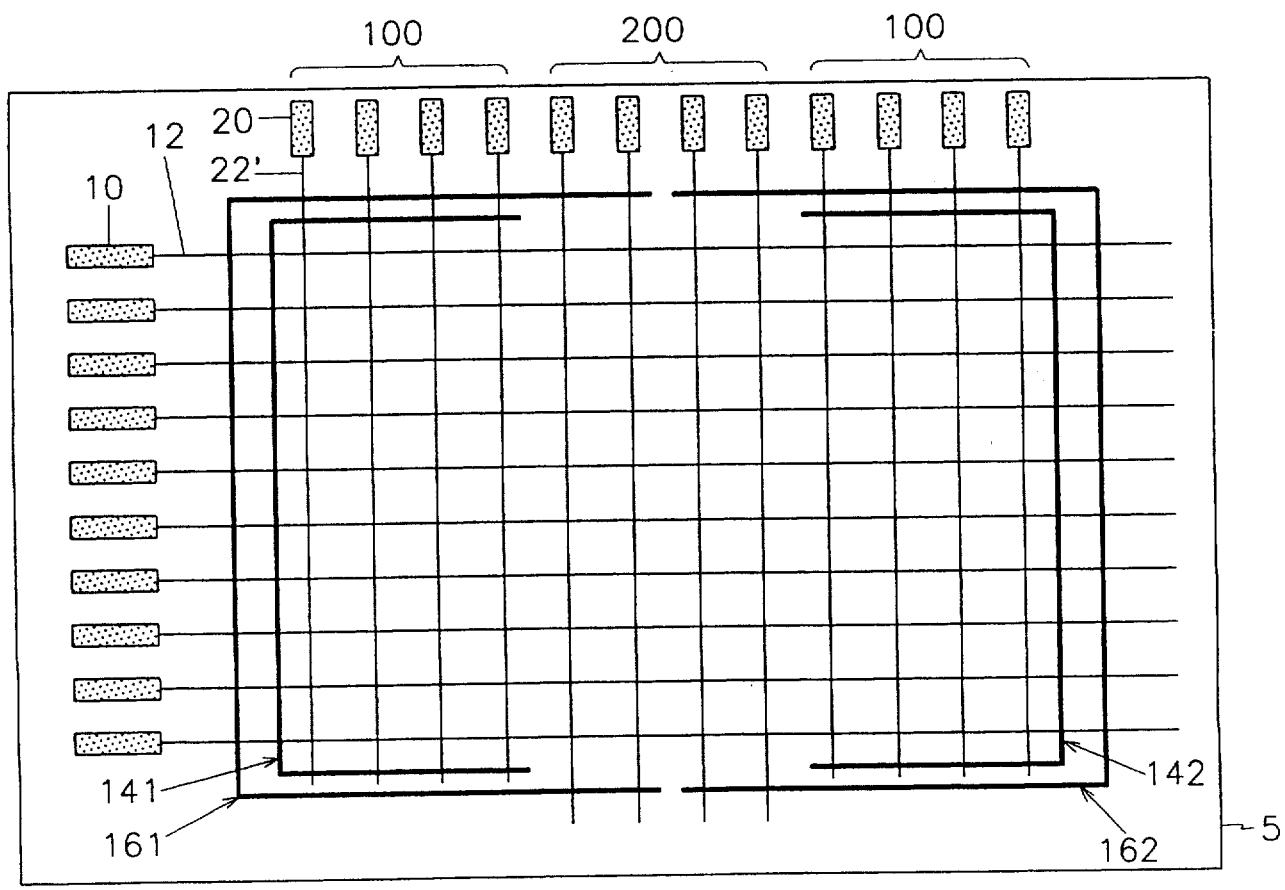
Figure 3:
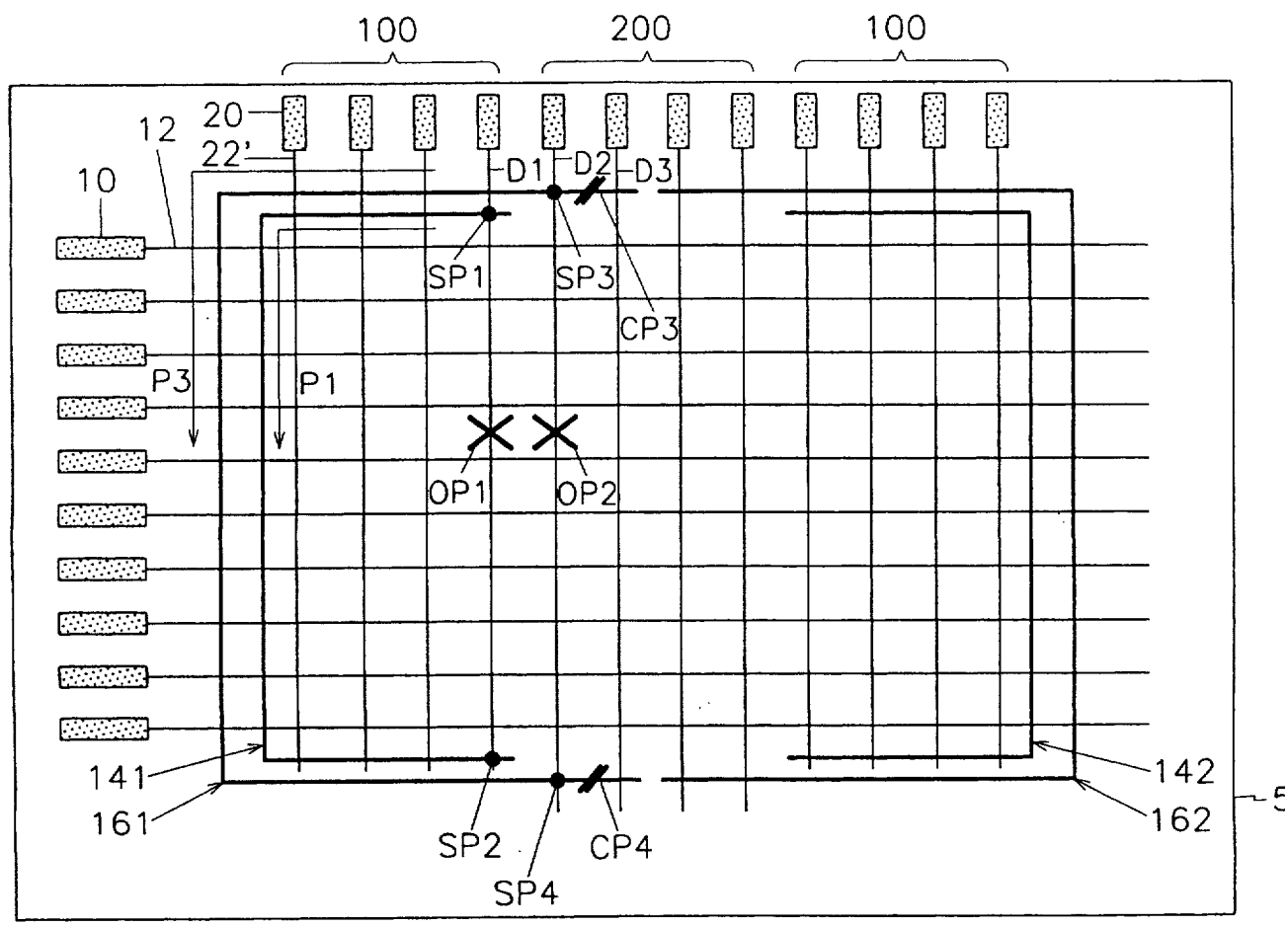

Some of the objects and advantages of the present invention having been stated, others will be more fully understood from the detailed description that follows and by reference to the accompanying drawings in which:

FIG. 1 is a plan view illustrating a liquid crystal display (LCD) panel according to the prior art;

FIG. 2 is a plan view illustrating an LCD panel according to an embodiment of the present invention; and FIG. 3 is a plan view of the LCD panel embodiment of FIG. 2 illustrating repair operations according to the present invention.

DETAILED DESCRIPTION OF PREFERRED EMBODIMENTS

The present invention now will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As is shown in FIG. 2, a plurality of gate lines 12 are arranged on a substrate 5 in a transverse direction. Each gate line has an input pad 10 to which a gate signal may be applied. A plurality of data lines 22' are arranged in a longitudinal direction and cross the gate lines 12. Each data line has an input pad 20 to which a data signal may be applied. A gate line 12 and a data line 22' are connected to a pixel (not shown) having a pixel electrode (not shown) and a switching element (not shown), with the pixels occupying areas defined by the gate lines 12 and the data lines 22'. The data lines 22' are grouped into a first group 100 overlying a first peripheral portion of the substrate 5 and a second group 200 overlying a medial portion of the substrate 5. The data lines 22' of the second group 200 preferably have longer lengths than the data lines 22' of the first group 100. A first repair line 141 crosses the data lines 22' of the first group 100 on both sides of the gate lines 10. A second repair line 161 crosses the first and second groups 100, 200 on a first side of the gate lines 10, crosses the second group 200 on a second side of the gate lines 10, but avoids crossing the first group 100 on the second side of the gate lines 10. Mirroring the first and second repair lines 141, 161, a third repair line 142 crosses a first group of data lines 100 on both sides of the gate lines 10, while a fourth repair line 162 crosses the first group 100 and a second groups 200 on one side of the gate lines 10, but only crosses the second group 200 on the other side of the gate lines 10.

As illustrated in FIG. 3, if first and second data lines D1, D2 are opened at open points OP1, OP2, respectively, the first data line D1 and the first repair line 141 may be shorted at their two crossing points SP1, SP2, and the second data line D2 and the second repair line 161 may be shorted at their two crossing points SP3, SP4. The second repair line 161 may then be cut at two points CP3, CP4 between the short points SP3, SP4 crossing points of the repair line 161 and the adjacent data line D3. This allows signals applied to the input pads 20 of the first and second data lines D1, D2 to reach portions of the first and second data lines D1, D2 below the open points OP1, OP2, using the path P1 of the first repair line 141 and the path P3 of the second repair line 161, respectively. The path P3 crosses the data lines 22' six times, in contrast to the ten crossings of the conventional method illustrated in FIG. 1. This may allow the RC delay in the data signal along path P3 to be reduced, potentially improving image quality.

In the drawings and specification, there have been disclosed typical embodiments of the invention and, although specific terms are employed, they are used in a generic and descriptive sense only and not for purposes of limitation, the scope of the invention being set forth in the following claims.

What is claimed is:

1. A liquid crystal display panel, comprising:

a substrate;

a plurality of gate lines on said substrate;

a plurality of data lines on said substrate extending transverse to said plurality of gate lines, said plurality of data lines including first and second groups of data lines;

a first repair line on said substrate which crosses said first group of data lines on respective opposite first and second sides of said plurality of gate lines; and a second repair line on said substrate which crosses said first and second groups of data lines on said first side of said plurality of gate lines, which crosses said second group of data lines on said second side of said plurality of gate lines, and which avoids crossing said first group of data lines on said second side of said plurality of gate lines.

2. A panel according to claim 1, wherein said first group of data lines is disposed laterally adjacent said second group of data lines.

3. A panel according to claim 2, wherein each of said first and second repair lines extends across said plurality of gate lines on a side of said plurality of data lines.

4. A panel according to claim 3, wherein said second group of data lines extend past said first group of data lines on said second side of said plurality of gate lines.

5. A panel according to claim 2:

wherein said first group of data lines is disposed on a first peripheral portion of said substrate;

wherein said second group of data lines is disposed on a first medial portion of said substrate adjacent said first peripheral portion;

wherein said plurality of data lines further comprises:

a third group of data lines on a second medial portion of said substrate adjacent said first medial portion; and a fourth group of data lines on a second peripheral portion of said substrate laterally adjacent said second medial portion; and wherein the panel further comprises:

a third repair line on said substrate which crosses said fourth group of data lines on said first and second sides of said plurality of gate lines; and a fourth repair line on said substrate which crosses said third and fourth groups of data lines on said first side of said plurality of gate lines, which crosses said third group of data lines on said second side of said plurality of gate lines, and which avoids crossing said fourth group of data lines on said second side of said plurality of gate lines.

6. A panel according to claim 5 wherein said third and fourth repair lines each extend across said gate lines on a side of said plurality fourth group of data lines opposite said third group of data lines.

7. A panel according to claim 6, wherein said second and third groups of data lines extend past said first and fourth groups of data lines on said second side of said plurality of gate lines.

8. A liquid crystal display panel, comprising:

a substrate;

a plurality of gate lines on said substrate;

a plurality of data lines on said substrate extending transverse to said plurality of gate lines;

a plurality of repair lines on said substrate, a respective one of which crosses a selected group of said plurality of data lines on both of opposite first and second sides of said plurality of gate lines and which avoids crossing data lines other than said selected group of data lines on said second side of said plurality of gate lines.

9. A panel according to claim 8, wherein each of said plurality of repair lines extends across said plurality of gate lines on a side of said plurality of data lines.

10. A liquid crystal display panel, comprising:

a substrate;

a plurality of first lines on said substrate;

a plurality of second lines on said substrate extending transverse to said plurality of first lines;

a repair line on said substrate which crosses a selected group of said plurality of second lines on both of opposite first and second sides of said plurality of first lines and which avoids crossing second lines other than said selected group of second lines on said second side of said plurality of first lines.

11. A panel according to claim 10, wherein said repair line extends across said plurality of first lines on a side of said plurality of second lines.

12. A method of repairing an open data line of a liquid crystal display panel including a substrate, a plurality of gate lines on the substrate, and a plurality of data lines on the substrate, the plurality of data lines extending transverse to the plurality of gate lines, the method comprising the steps of:

connecting separated portions of the open data line with a repair line which crosses a selected group of the data lines on respective opposite first and second sides of the plurality of gate lines and which avoids crossing data lines of the plurality of data lines other than the selected group of data lines on the second side of the plurality of gate lines.

13. A method according to claim 12, wherein said step of connecting comprises the steps of:

connecting a first portion of the open data line and the repair line at a first point on the first side of the plurality of gate lines; and connecting a second portion of the open data line and the repair line at a second point on the second side of the plurality of gate lines.

* * * * *